US010258521B2

(12) United States Patent
Vigentini et al.

(10) Patent No.: US 10,258,521 B2
(45) Date of Patent: Apr. 16, 2019

(54) INVERTED PENDULUM TYPE VEHICLE

(71) Applicant: MARIOWAY S.r.l., Milan (IT)

(72) Inventors: Mario Vigentini, Vailate (IT); Massimo Ghidelli, Casnigo (IT); Stefano Martinelli, Bergamo (IT)

(73) Assignee: Marioway S.R.L. (IT)

( * ) Notice: Subject to any disclaimer, the term of this patent is extended or adjusted under 35 U.S.C. 154(b) by 0 days.

(21) Appl. No.: 15/385,251

(22) Filed: Dec. 20, 2016

(65) Prior Publication Data

US 2017/0100290 A1 Apr. 13, 2017

Related U.S. Application Data

(63) Continuation of application No. 14/905,950, filed as application No. PCT/IB2014/063703 on Aug. 5, 2014.

(30) Foreign Application Priority Data

Aug. 9, 2013 (IT) .............................. BG2013A0021

(51) Int. Cl.
*A61G 5/14* (2006.01)
*A61G 5/04* (2013.01)
(Continued)

(52) U.S. Cl.
CPC .............. *A61G 5/041* (2013.01); *A61G 5/04* (2013.01); *A61G 5/043* (2013.01); *A61G 5/1051* (2016.11);
(Continued)

(58) Field of Classification Search
CPC ...... A61G 5/043; A61G 5/042; A61G 5/1059; A61G 5/12; A61G 5/04; A61G 5/006;
(Continued)

(56) References Cited

U.S. PATENT DOCUMENTS 4,231,614 A * 11/1980 Shaffer .................... A61G 5/12
297/320
4,581,778 A * 4/1986 Pontoppidan ........ A61G 7/1017
297/DIG. 10
(Continued)

FOREIGN PATENT DOCUMENTS

CN 103385791 A 11/2013
WO 8801578 A1 3/1988
(Continued)

OTHER PUBLICATIONS

International Search Report dated Apr. 12, 2014 in corresponding PCT Patent Application No. PCT/iB2014063703 filed Aug. 5, 2014.

*Primary Examiner* — Joseph M Rocca
*Assistant Examiner* — Daniel S Yeagley
(74) *Attorney, Agent, or Firm* — Waller Lansden Dortch & Davis, LLP; Matthew C. Cox

(57) ABSTRACT

An electric locomotion apparatus including a dynamically stabilized vehicle including two wheels, the vehicle including a pivot arranged along a longitudinal axis and rotatable about the longitudinal axis. The pivot is configured to transfer a steering control to the wheels. A seat is positioned on the vehicle, wherein the seat is configured to accommodate a user affected by motor disability of the lower limbs, the seat being tiltable sideways by a lateral shift of the user's weight. The locomotion apparatus further includes one or more transmission device arranged between the seat and the pivot, the transmission device configured to transfer a tilting movement of the seat to the pivot. A first rod and a second rod can be centrally pivoted together, the second rod pivotally fixed to the vehicle, and the seat being associated with a second end of the first rod.

7 Claims, 5 Drawing Sheets

(51) Int. Cl.
  *A61G 5/10* (2006.01)
  *B62K 3/16* (2006.01)
  *B62K 11/00* (2006.01)
  *B62J 1/08* (2006.01)
  *B62K 23/00* (2006.01)

(52) U.S. Cl.
  CPC ......... *A61G 5/1056* (2013.01); *A61G 5/1089* (2016.11); *A61G 5/14* (2013.01); *B62J 1/08* (2013.01); *B62K 3/16* (2013.01); *B62K 11/007* (2016.11); *B62K 23/00* (2013.01); *A61G 2200/34* (2013.01); *A61G 2200/38* (2013.01); *B62J 2001/085* (2013.01); *B62K 2204/00* (2013.01)

(58) Field of Classification Search
  CPC ...... A61G 5/1029; A61G 5/1056; A61G 5/14; A61G 5/1051; A61G 5/1089; A61G 2200/38; B62K 3/16; B62K 11/007; B62J 2001/085
  See application file for complete search history.

(56) References Cited

U.S. PATENT DOCUMENTS

| | | | | |
|---|---|---|---|---|
| 4,614,246 A * | 9/1986 | Masse | ........... | A61G 5/042 180/6.5 |
| 5,669,620 A * | 9/1997 | Robbins | ........... | A61G 3/02 280/250.1 |
| 5,927,679 A * | 7/1999 | Hill | ........... | B60N 2/502 248/421 |
| 6,142,568 A * | 11/2000 | Abelbeck | ........... | A61G 5/1059 297/330 |
| 7,434,824 B2 * | 10/2008 | Connors | ........... | A61G 5/1029 188/109 |
| 7,988,172 B2 * | 8/2011 | Richter | ........... | A61G 5/1059 280/250.1 |
| 8,340,869 B2 * | 12/2012 | Wakita | ........... | A61G 5/04 180/316 |
| 8,585,004 B1 * | 11/2013 | Roeglin | ........... | F16M 11/18 248/421 |
| 9,156,516 B2 * | 10/2015 | Kahlert | ........... | B62H 1/12 |
| 9,205,746 B2 * | 12/2015 | Sekine | ........... | B60L 3/0061 |
| 2002/0149168 A1 * | 10/2002 | Brown | ........... | A61G 5/1059 280/250.1 |
| 2004/0227331 A1 * | 11/2004 | Chen | ........... | A61G 5/006 280/650 |
| 2005/0046129 A1 * | 3/2005 | Antonishak | ........... | A61G 5/043 280/47.4 |
| 2005/0121866 A1 | 6/2005 | Kamen et al. | | |
| 2007/0063480 A1 * | 3/2007 | Porcheron | ........... | A61G 5/12 280/304.1 |
| 2011/0204592 A1 | 8/2011 | Johansen et al. | | |
| 2011/0303475 A1 | 12/2011 | Kim | | |
| 2013/0085632 A1 | 4/2013 | De Laurentis et al. | | |
| 2014/0262566 A1 * | 9/2014 | Davis | ........... | A61G 5/1059 180/54.1 |

FOREIGN PATENT DOCUMENTS

| | | |
|---|---|---|
| WO | 2009054344 A1 | 4/2009 |
| WO | 2014007657 A1 | 1/2014 |

* cited by examiner

INVERTED PENDULUM TYPE VEHICLE

CROSS-REFERENCES TO RELATED APPLICATIONS

This application is a continuation of co-pending U.S. patent application Ser. No. 14/905,950 filed Jan. 18, 2016 entitled INVERTED PENDULUM TYPE VEHICLE, which claims priority to PCT/IB2014/063703 filed Aug. 5, 2014 entitled INVERTED PENDULUM TYPE VEHICLE, which claims priority to Italian Patent Application Priority No. BG2013A000021 filed Aug. 9, 2013, all of which are herein incorporated by reference in their entireties.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates to an electric locomotion apparatus, more particularly relates to an electric locomotion apparatus suitable for people with walking problems and/or paraplegics.

As is known, there are locomotion means for people with walking problems such as wheelchairs for example, which can be manual or electric.

There are also dynamically stabilised vehicles that have a control system that actively maintains the stability of the vehicle, which normally only have two wheels. Appropriate sensors continuously control vehicle orientation and the control circuit determines the necessary corrections for maintaining stability by suitably commanding the wheel motors. For example, the vehicles shown in documents US 2011/303475 A1 and WO 2009/054344 A1 are known in the prior art.

Disadvantageously, none of the devices described in the documents of the prior art are suitable for transporting a person with a disability of the lower limbs, as some of these devices require that the user stand up. Other devices allow the user to sit, but still require the use of the legs to steer, as they require a rotation of the seat with respect to a vertical axis.

BRIEF SUMMARY

The aim of the present invention is to provide for a new concept electric locomotion apparatus, in particular suitable for people with walking problems and/or paraplegics, which allows the person position themselves at a height equal to that of a standing person, and which can also move at the same time.

Another aim is to provide for an electric locomotion apparatus that can allow the user, through a specific seated position, to unload part of their own weight onto the knees thus lightening the load on the coccyx, which using the muscles of the lower limbs.

Another aim is to provide for an electric locomotion apparatus that can be used in both indoor and outdoor environments and that can vary its height to adapt to the altered conditions.

A further aim is to provide for an electric locomotion apparatus that can adapt to different user dimensions in a simple way.

These problems are overcome by an electric locomotion apparatus according to the present invention. This locomotion apparatus comprises a dynamically stabilised vehicle comprising two wheels. The vehicle has a transverse axis that is defined by an axis of rotation of the wheels. The vehicle also has a longitudinal axis that is perpendicular to the transverse axis and that defines a direction of advancement of the vehicle.

The vehicle comprises a pivot arranged along the longitudinal axis and that is rotatable about the longitudinal axis. The pivot is configured to transfer a steering command to the wheels. The locomotion apparatus further comprises a seat positioned on the vehicle. The seat is configured to accommodate a user affected by motor disability of the lower limbs. The seat is laterally tiltable by a lateral displacement of the user's weight. The locomotion apparatus further comprises transmission means arranged between the seat and the pivot. The transmission means are configured to transfer a tilting movement of the seat to the pivot.

Advantageously, in the locomotion apparatus according to the present invention, a slight lateral displacement of the user's weight is sufficient to control the steering of the locomotion apparatus. This movement can also be easily performed by people affected by disability of the lower limbs, making the locomotion apparatus suitable for their transport.

Further characteristics of the invention are described in the dependent claims.

BRIEF DESCRIPTION OF THE DRAWINGS

Further characteristics and advantages of the present invention will become apparent from the following detailed description of a practical embodiment thereof, illustrated by way of non-limiting example in the accompanying drawings, in which.

DETAILED DESCRIPTION

Figure 1:
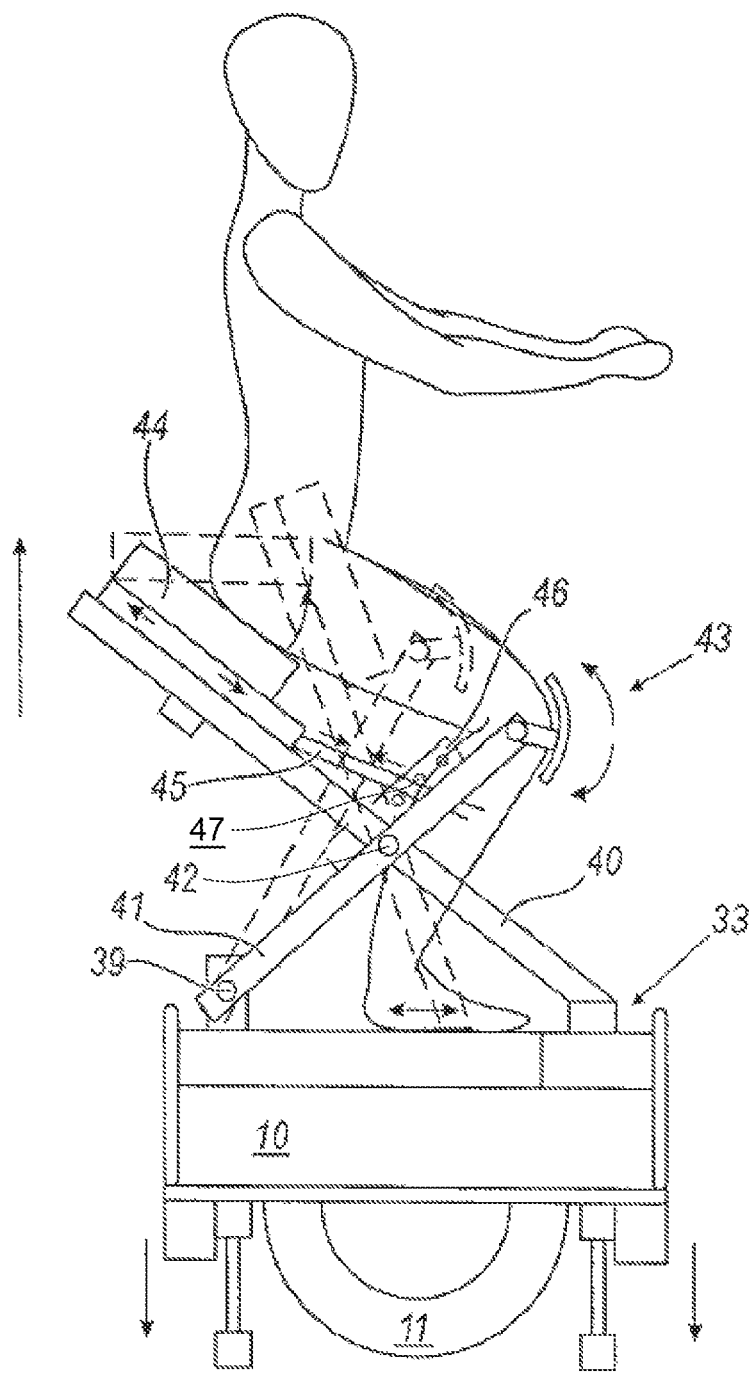
FIG. 1 shows a schematic side view of an electric locomotion apparatus according to the present invention.
Figure 2:
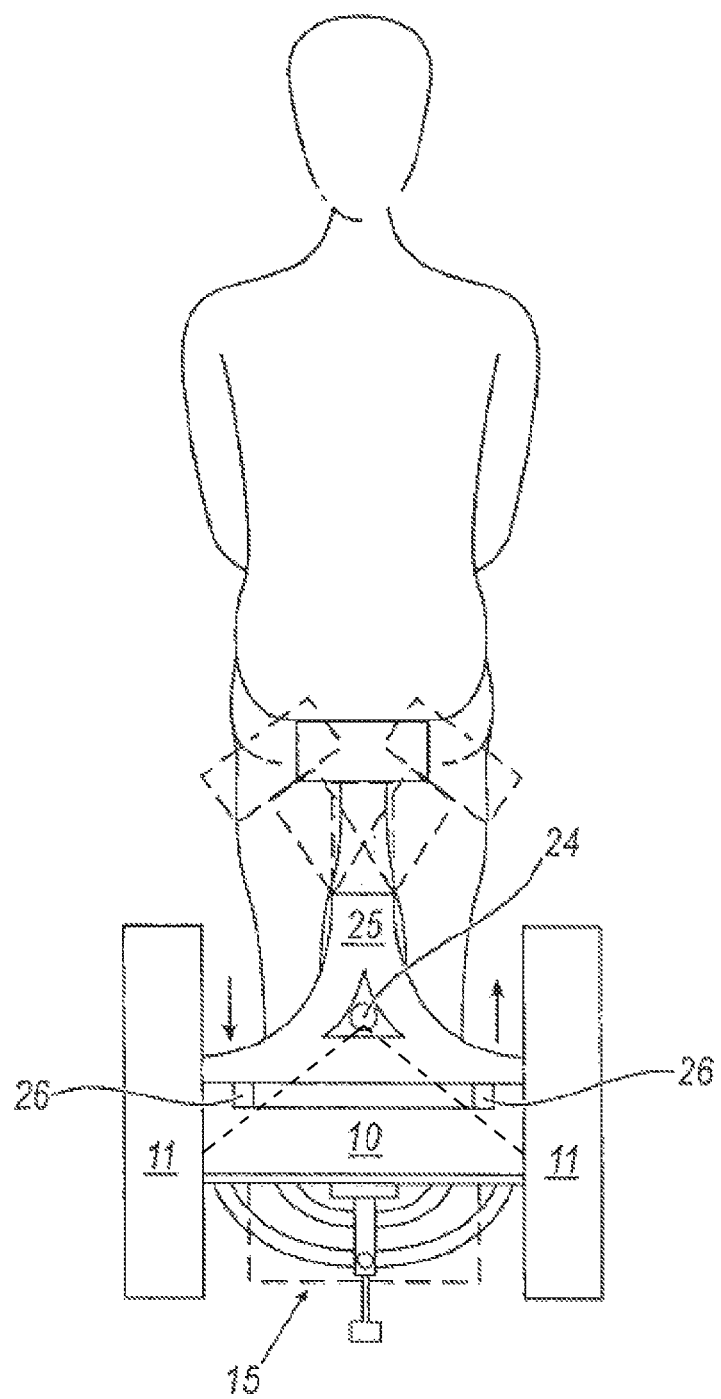
FIG. 2 schematically shows a front view of an electric locomotion apparatus according to the present invention.
Figure 3:
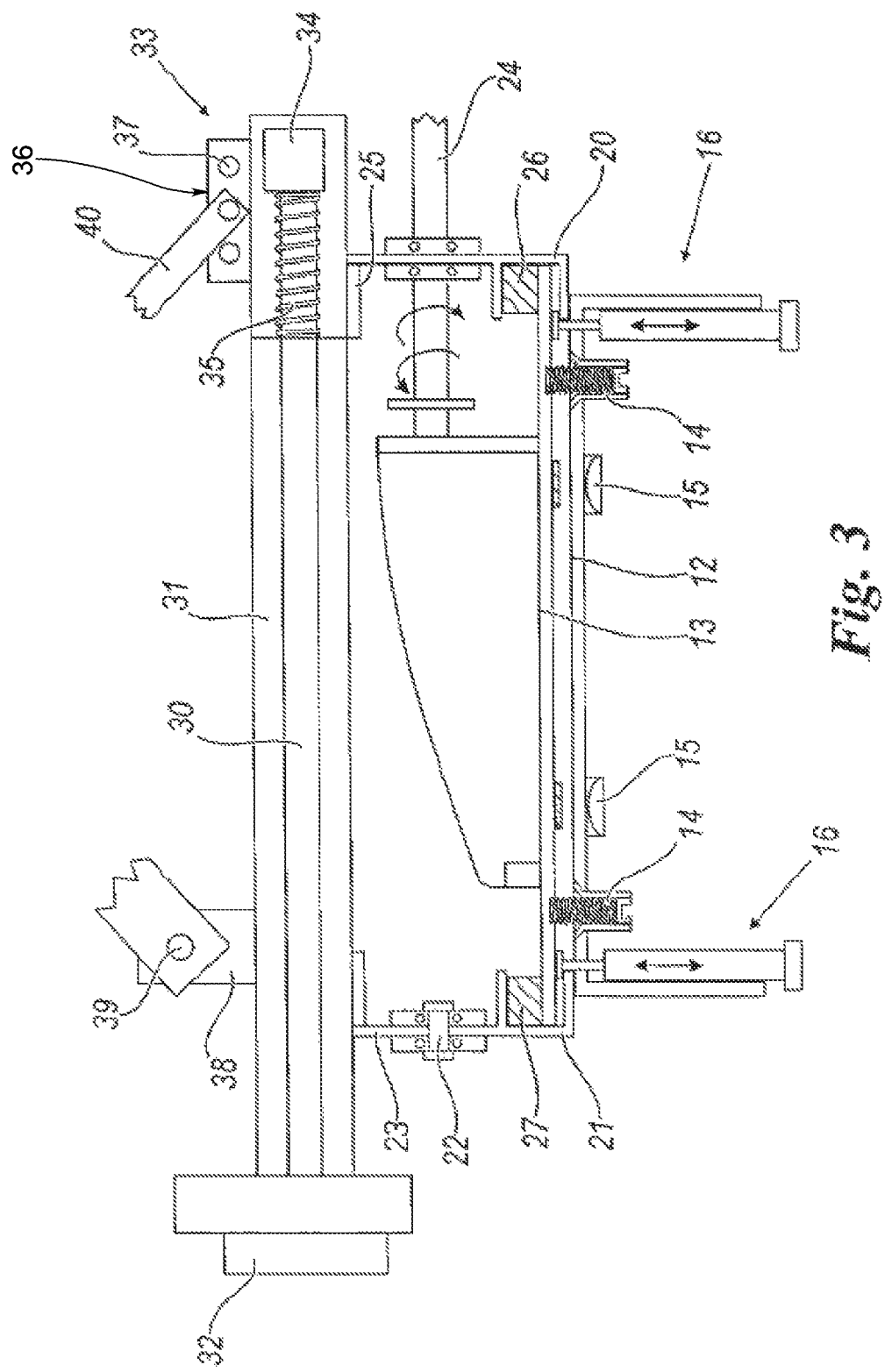
FIG. 3 schematically shows a side view of a lower portion, without the wheels, of an electric locomotion apparatus according to the present invention.
Figure 4:
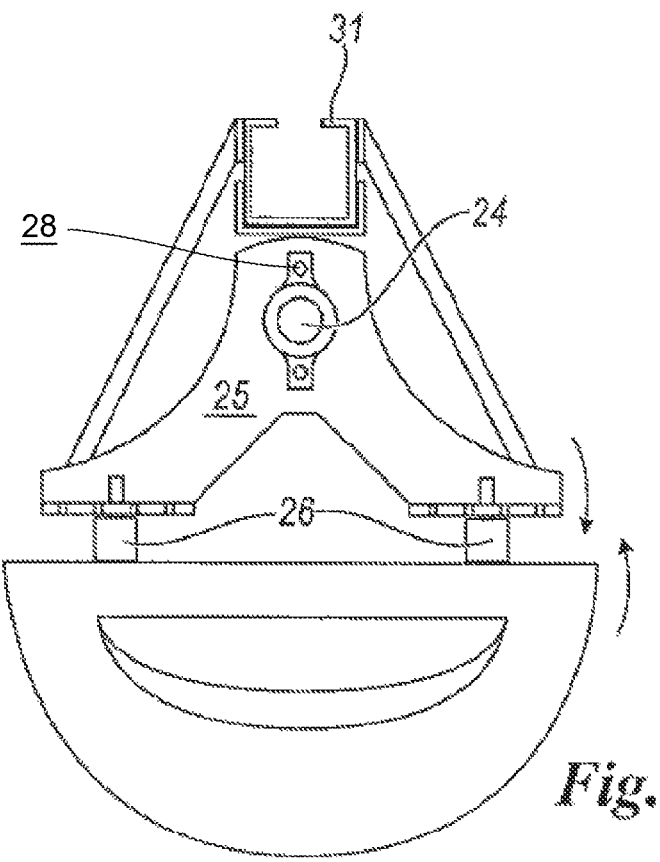
FIG. 4 schematically shows a front view of a lower portion of an electric locomotion apparatus according to the present invention.
Figure 5:
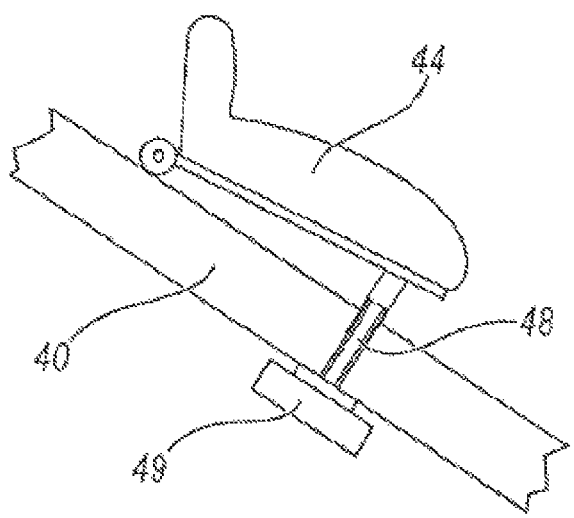
FIG. 5 schematically shows a side view of a seating system of an electric locomotion apparatus according to the present invention.
Figure 6:
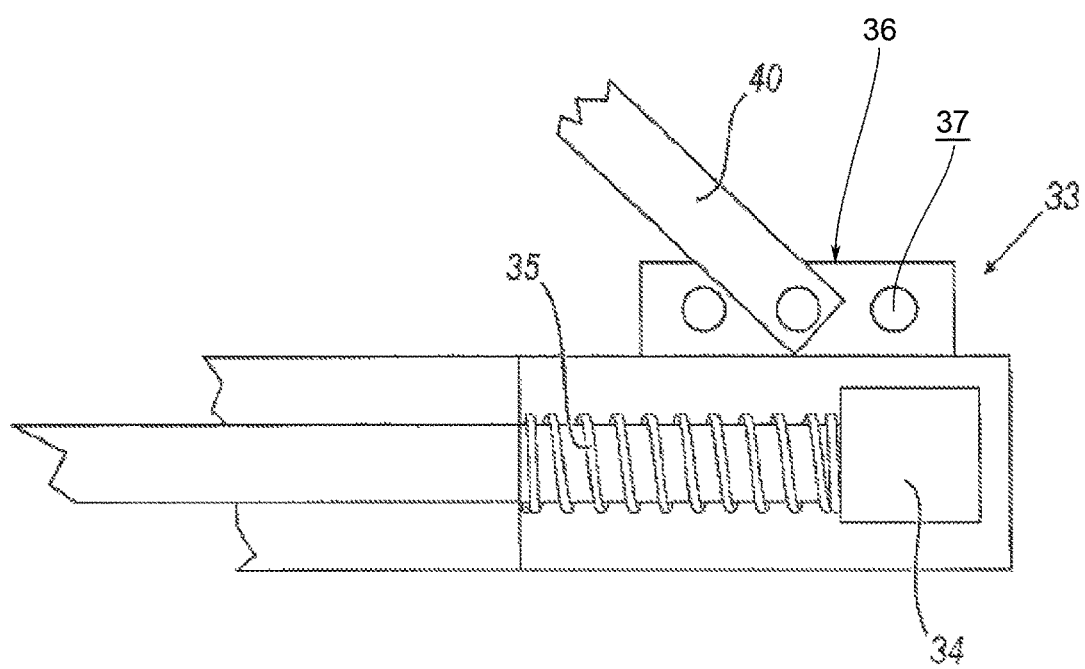
FIG. 6 schematically shows a portion of an electric locomotion apparatus, a side view of which is shown in FIG. 3, according to the present invention.

With reference to the accompanying figures, an electric locomotion apparatus, according to the present invention, comprises a dynamically stabilised vehicle 10 having two wheels 11.

A base plate 13 is superposed to the upper surface 12 of the vehicle 10.

The plate 13 is in rest position, raised from the surface 12 due to the presence of elastic dampers 14.

On the surface 12 are the switches 15 (usually four) that enable the vehicle 10 to start. Shims suitable for facilitating the pressure of the switches 15 can be found opposite the switches 15.

The plate 13 further comprises an actuator, anteriorly and posteriorly. Preferably, this actuator is a hydraulic piston 16, electrically or manually controlled by a hydraulic system.

The hydraulic pistons 16 extend to touch the ground and to stabilise the vehicle so that the user can get on, indeed the pistons 16 and the two wheels 11 form four ground points.

Anteriorly and posteriorly from the surface 12 rise two support plates, respectively 20 and 21, which are substantially triangular in shape frontally and L-shaped laterally.

The rear plate 21 supports a further plate 23 by means of a pivot 22. The plate 23 can rotate about the pivot 22 with respect to the plate 21.

The front plate 20 supports a further plate 25 by means of a pivot 24. The plate 25 can rotate about the pivot 24 with respect to the plate 20. In this case, however, the plate 25 is fixed to the pivot 24 and thus a rotation of the plate 25 rotates the pivot 24.

The rotation of the plates 25 and 23 is, however, limited to small angles by the presence, between the base of the L, of the plates 25 and 23, and the base plate 13 of the elastic shims 26 and 27, which allow rotation in that they are deformable, being made of rubber.

There are two shims 26 and 27 per plate, positioned laterally thereto.

Moreover, for a greater adjustment of the sensitivity to rotation, the elastic shims 26 and 27 can be fixed to the plates 25 and 23 in different positions, by means of screws, i.e. more or less sideways with respect to the pivot 24, by means of an arrangement of holes 28 in the plates 25 and 23.

It is alternatively possible to use other mechanisms to adjust the sensitivity to rotation, by using a knob that shifts the position of the elastic shims 26 and 27, for example.

The plates 25 and 23 supporting a guide 31 within which a feed screw 30 can rotate.

Fixing of the guide 31 onto the plates 25 and 23 can be performed so as to adjust the relative position thereof in order to maintain the user's centre of gravity (associated with that of the seat) in the correct position with respect to the dynamically stabilised vehicle 10.

The feed screw 30 is electrically driven by a motor 32. It is alternatively possible to use other mechanisms such as a hydraulic piston or linear actuators.

On the feed screw 30 is a movable slider 33.

The slider 33 comprises in its interior a bearing 34 and a spring 35 to ensure an elastic force reaction to possible thrusts contrary to the movement.

A movable plate 36 comprising a series of holes 37 is arranged on the slider 33.

A fixed back plate 38 having at least one hole 39 is fixed to the guide 31, posteriorly to the portion of feed screw 30 on which the slider 33 can slide.

A front rod 40 is movably pivoted in one of the holes 37.

A rear rod 41 is movably pivoted in the hole 39.

The two rods 40 and 41 are movably joined together by means of a pivot 42 passing through both the rods at a point that is intermediate thereto.

The rods 40 and 41 have a plurality of holes so that the pivot 42 can be inserted into the most suitable hole.

A knee/shin rest 43 is positioned on the front end of the rod 41, opposite the pivot 39. Two short bars (lengthways-adjustable) fixed to the front end of the rod 41 are supporting two folding anatomical half-shells that support the knees/shins of the user.

A seat 44 can slide along the rod 40 itself on the rear end of the rod 40, opposite the slider 33. Its position is optimally determined by means of a first bar 45 that is fixed on to the seat 44 on one side and to a second bar 46 on the other side that is fixed to the rod 41 in the central portion thereof. The second bar 46 comprises a plurality of holes 47. The first bar 45 is pivoted with the second bar 46 in one of the holes 47.

The seat 44 also has the ability to tilt with respect to the rod 40. Indeed, underneath it and passing through the rod 40, it comprises a threaded bar 48 having an adjustment knob 49. Other movement means of the seat 44 can be used.

In addition to the control system for the dynamically stabilised vehicle 10, the vehicle preferably comprises a further battery (not shown), as well as a control (not shown) for operating the motor 32 in one direction and in the opposite direction, operating means (not shown) of the hydraulic cylinders 16.

The operation of the invention is apparent, to a person skilled in the art, from what has been described and is, in particular, as follows.

Depending on his overall size, the size of his femur and other considerations, the user suitably fixes all the present adjustments onto the locomotion apparatus.

The user in particular fixes the elastic shims 26 and 27 in a position according to his weight and according to the desired steering sensitivity; he positions the pivot 42 between the two rods 40 and 41 to adjust the height of the seat 44 and optimise motor torque (if the pivot 42 is moved towards the slider 33, uphill speed is increased but the motor struggles more and vice versa); position the first bar 45 on the second bar 46 to maintain the correct proportion of movements with respect to the seat 44 during movement of the rods 40 and 41; arrange the positioning of the rod 40 on the slider 33 to adjust the maximum lowering of the rod 40; adjust the tilt of the seat 44 by means of the knob 49.

The user operates the hydraulic pistons 16 by lowering them and stabilising the locomotion means. He can then get on and sit on the seat 44 and rest his knees on the knee/shin rest 43 without any problem.

The user's weight sufficiently lowers the base plate 13, as permitted by the elastic dampers 14, towards the surface 12 and the switches 15 are pressed and the dynamically stabilised vehicle can then be started.

The user starts the motor 32, which drives the feed screw, bringing the motor 32 closer to the slider 33 and the entire rod system rises and consequently raises the seat 44, until the desired height is reached.

He starts up the dynamically stabilised vehicle 10 in the usual way and then raises the hydraulic pistons 16.

The electric locomotion means is thus ready to be used.

If the user needs to go forward or reverse, he pushes his body forward or backward as in the case of usual dynamically stabilised vehicle 10.

For bends, instead of operating the normal handlebar present in all dynamically stabilised vehicles, the user tilts sideways to the left or right, by the same almost imperceptible amount as when moving forward or backward, and the vehicle will steer accordingly.

Moving to the left or right, the body's weight rotates the plates 23 and 25. The plate 25 rotates the pivot 24 which is nothing other than the pivot that is normally fixed to the steering wheel of dynamically stabilised vehicles.

To descend from the locomotion means, the user sits in the most vertical position possible in order to stop the locomotion means, then the hydraulic pistons 16 are lowered. The plate 13 is raised from the surface 12 and the switches 15 are released. The dynamically stabilised vehicle is completely switched off and the user gets off directly or the motor 32 is started so as to lower the seat 44.

We thus have an electric locomotion apparatus that makes use of a dynamically stabilised vehicle that comprises a horizontally-pivoted platform that is adapted and pivoted to the steering head, which eliminates the steering rod, so as to permit the user to steer using body weight alone, thus freeing the hands. Special mechanisms allow a manual and/or motorised micrometric adjustment, to adjust steering according depending on user weight, user height, seat height, user asymmetries.

The seat on the electric locomotion means is ergonomic and dynamic, i.e. its height is adjustable. This allows a relational symmetry of the user i.e. the user is at the same height as the people in front of him, and thus improves interpersonal relations, improves blood circulation, improves the functioning of the digestive system, limits compression of the diaphragm, eliminates overloading of the lumbosacral region, prevents pressure sores, osteopenia and osteoarthritis, promotes musculoskeletal elasticity, permits passive exercise therapy (by operating the motor 32 for example), limits overloading of the musculoskeletal system.

The dynamic ergonomic seat is always balanced and constantly maintains the user's centre of gravity in axis, allowing movement in any direction at any height selected.

The seat is also damped, with respect to ground roughness, thanks to the springs 35.

The geometry of the electric locomotion means adapts to the user's skeletal measurements.

The seat can be varied through a micrometric adjustment on the basis of the length of the femur, the shin, the delta (femur/shin ratio and geometry of the centre of gravity), longitudinal axis, steering sensitivity and LH and RH asymmetry corrections.

What is claimed is:

1. An electric locomotion apparatus comprising:
a dynamically stabilised vehicle comprising two wheels, said vehicle having a transverse axis defined by an axis of rotation of said wheels and a longitudinal axis that is perpendicular to said transverse axis and defines a direction of advancement of said vehicle, said vehicle comprising a pivot arranged along said longitudinal axis and rotatable about said longitudinal axis, said pivot being configured to transfer a steering control to said wheels; a seat positioned on said vehicle; wherein said seat is configured to accommodate a user affected by motor disability of the lower limbs, said seat being tiltable sideways by a lateral shift of the user's weight; said locomotion apparatus further comprising one or more transmission device arranged between said seat and said pivot, said transmission device being configured to transfer a tilting movement of the seat to said pivot;

wherein the electric locomotion apparatus comprises a first rod, a second rod that is centrally pivoted to said first rod, said second rod having a first end that is pivotally fixed to said vehicle; a linear actuator that is fixed to a first end of said first rod, said seat being associated with a second end of said first rod, the linear actuator operable for raising and lowering said seat; and one or more knee and/or shin rests connected at a second end of said second rod, the one or more knee and/or shin rests configured for abutting against the user's knees and/or shins, and wherein the seat and the one or more knee and/or shin rests move relative to one another as the linear actuator is operated for longitudinally maintaining a center of gravity of a user on the seat as the seat is raised or lowered by the linear actuator.

2. The locomotion apparatus according to claim 1, wherein said transmission device comprises a connecting plate that is fixed to said pivot and positioned to transfer tilting movement of said seat to said pivot.

3. The locomotion apparatus according to claim 1, wherein said seat is configured to slide along said first rod and is fixed to one end of a first bar having an opposing end of the first bar pivoted at a predetermined point of said second rod.

4. The locomotion apparatus according to claim 1, comprising a threaded rod having a knob, which is associated with said first rod to adjust the tilt of said seat.

5. The locomotion apparatus according to claim 1, comprising a base plate; a plurality of elastic shims positioned between said base plate and said vehicle.

6. The locomotion apparatus according to claim 5, comprising a switch, located on an upper surface of said vehicle; a plurality of elastic dampers located between said base plate and said vehicle, said elastic dampers being configured to compress with the user's weight so that said base plate and said vehicle come closer to activate said switch.

7. The locomotion apparatus according to claim 1, comprising at least one hydraulic piston positioned on said vehicle and configured to extend to touch the ground and stabilize the vehicle.

* * * * *